Jan. 8, 1963   E. J. STERNGLASS   3,072,819
THERMAL DETECTION METHOD AND APPARATUS
Filed March 25, 1954   2 Sheets-Sheet 1

INVENTOR
ERNEST J. STERNGLASS
BY
ATTORNEYS

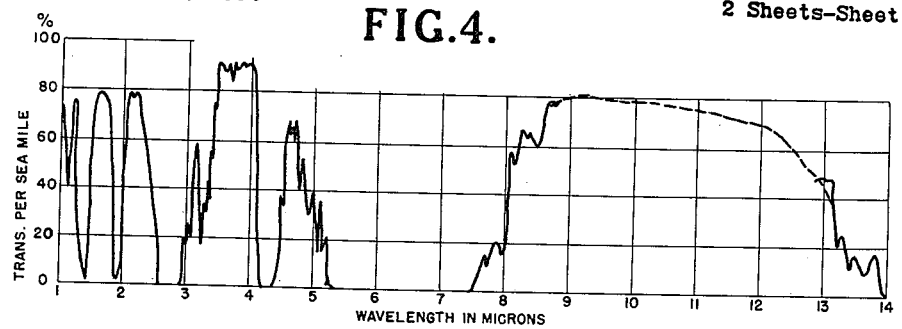
FIG.4.
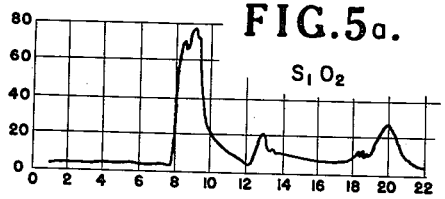
FIG.5a. SiO₂
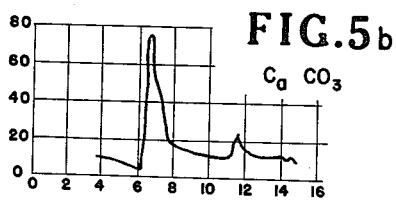
FIG.5b. CaCO₃
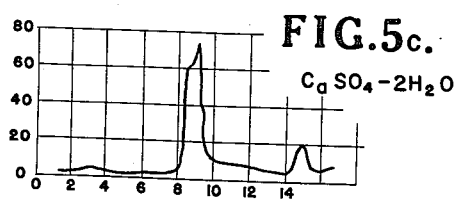
FIG.5c. CaSO₄-2H₂O
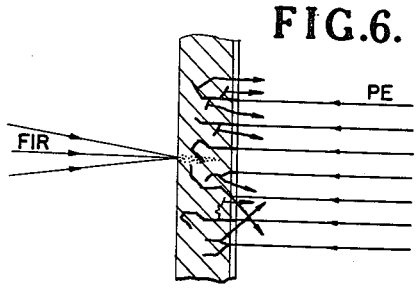
FIG.6.
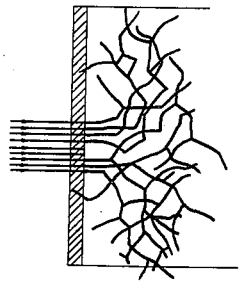
FIG.7.
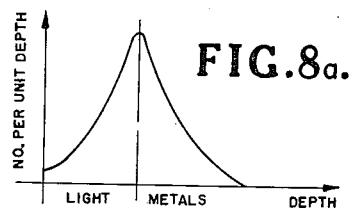
FIG.8a.
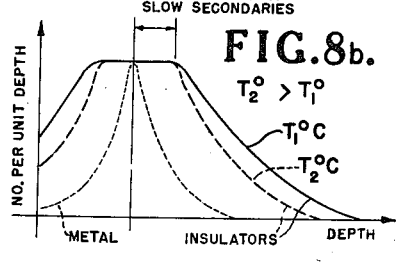
FIG.8b.
INVENTOR
ERNEST J. STERNGLASS
BY
ATTORNEYS … # 3,072,819
THERMAL DETECTION METHOD AND APPARATUS
Ernest J. Sternglass, 5700 Centre Ave., Pittsburgh, Pa.
Filed Mar. 25, 1954, Ser. No. 418,797
8 Claims. (Cl. 315—11)
(Granted under Title 35, U.S. Code (1952), sec. 266)

The invention described herein may be manufactured and used by or for the Government of the United States of America for governmental purposes without the payment of any royalties thereon or therefor.

This invention relates to thermal radiation detection methods and apparatus and more particularly to a thermo image tube structure capable of detecting far infra-red radiations as passed by atmospheric window effects and producing an image on a crystalline surface of a heat energy radiant or reflective body which is otherwise invisible to the unaided eye.

The invention further relates to the provision of a sensitive means for detecting thermal radiation in several of the spectral regions where the air transmits radiation, and to supply electrical output signals therefrom and by use of which visual images of radiant or radiation reflecting objects may be formed with the aid of suitable circuits and viewing tubes.

Prior devices sensitive to infra-red radiation of the desired wave-length are not capable of forming images and can therefore be used only to detect the presence of such radiation, although prior devices depending for their operation on photoelectric phenomenon, have been utilized in image producing devices for wave-lengths near the visible range. These devices utilize for their photoelectrically sensitive surfaces, semi-conductors or the like, having insulating properties.

Attempts have also been made to utilize changes in resistance in a sensitive surface due to the heat or thermal radiation but in general have met with little success. The usual scheme of this nature incorporates a bombarding or scanning electron beam to produce secondary electron emission from the insulating surface. Thereafter local increases in secondary emission due to impinging radiation from the heated object are utilized to provide a signal voltage correlative with image intensity. An image may be provided by applying the signal to a cathode ray tube which is operated in synchronism therewith.

The existant devices, however, are not sensitive far enough into the infra-red spectral region to produce the desired image as accomplished by this invention.

This invention proposes the utilization of the relationship existing at the lattice resonant condition of an insulating crystal wherein the secondary emission therefrom decreases when the amplitude of the lattice vibrations is increased, as for example, by heating, or in the device herein described, by far infra-red radiation near a proper or resonant frequency of the lattice. The physical phenomenon relating to this application is to be distinguished from that of the infra-red image detection tube of the image dissector type shown and described in the copending application to E. J. Sternglass, Serial No. 301,619, filed July 29, 1952 now Patent No. 2,788,452 wherein the surface utilized in that application is of a complex nature and displays increased secondary emission with increases in irradiation or temperature. The herein described invention, however, utilizes a crystal in lieu of the complex surface. The apparatus utilized is for detecting the infra-red image of a radiant object and obtaining a visual image therefrom by producing an output signal correlative with the secondary emission from the crystalline layer.

The preferred embodiment of this invention incorporates a generally conventional broad beam type electron gun as a source of fast high energy electrons for producing secondary electron emission from the crystal, a second electron gun with suitable arrangements for producing and sweeping a fine beam, which is in effect a pin point at the crystal surface, across the imaged areas, horizontal and vertical deflection arrangements therefor whereby the beam is sequentially scanned across the crystal surface in point by point relationship, and an electron multiplier of the photomultiplier type for pickup of reflected electrons of the scanning or probe gun. The infra-red radiation is focused on the crystal by passing it through suitable lenses of known character for this purpose and capable of passing such radiations.

In the conventional systems, over which this invention distinguishes, a high energy pin point probing electron beam moves across the back surface portions of the crystal, in a manner whereby the area unimpinged by radiant energy provides beam electron reflection to the collector-multiplier while the area under heat image effects does not permit reflection of the pin point beam, thereby presenting sensitivity correlative with the image which is focused on the forward surface of the crystal. The crystal surface responds to the infra-red radiations by providing a measurable increase in the secondary emission therefrom, from which an output may be derived in a well known manner.

In the instant system as hereinafter set forth in greater detail, a low energy probing beam neutralizes the potential difference on the non-imaged areas, and is reflected only with a decrease in secondary emission at the imaged portions of the surface. The dark current of the tube is thus maintained at a minimum.

Another embodiment of this invention utilizes monoscope tube principles to provide a signal output with changes of a decreasing nature in the secondary emission from a crystal surface.

The crystal and infra-red detector utilized in the instant invention is selected from the group of crystals displaying sensitivity in the wave-length band from 8 microns to 13 microns since in this region there is a veritable window in the natural absorption of infra-red radiation by the atmosphere. This is to be distinguished from available detectors or those presently being developed for use in the spectral region from 0.8 micron to about 5 or 6 microns, since all of the radiation in this region is not usable. However, the radiation within the instant selected region is absorbed to an extent less than 50% per sea mile and may be readily utilized for image detection and display. The physical process of the instant detection devices for detection of infra-red radiation relates to the interaction between the radiation from a thermal body and the secondary electron emission for the particular crystal insulator chosen. This interaction is of a radiation-induced resonant nature which provides a change in secondary emission when the secondary electrons are freed at the resonant condition of the crystal lattice. The crystalline surface is effectively bombarded with a beam of primary electrons to initiate liberation of secondary electrons within the body of the crystal which may occur at a depth in the order of 10 to 100 atomic layers, depending on the energy of the beam. The control of the energy level provides for the selection of proper operating conditions for the system. The secondary electrons diffuse in the crystal over considerable distances whereby a fraction thereof are able to escape from the surface. The number of secondary electrons which escape will be determined by their mean-free path for collison with the ions of the lattice. Vibrations of the ions about their equilibrium condition would reduce the mean-free path of the secondary in a ratio inversely proportional to the mean-square of the amplitude. It is well known that one manner of inducing such vibration is to heat the crystals and produce the decrease in the number of secondaries escaping from the surface.

Enhanced vibration may also be obtained without heating the material by irradiating it with infra-red radiation as utilized in the instant systems. This radiation is of a nature having the natural frequency condition thereof in a band falling within the natural resonant frequency of the crystal lattice. This natural frequency is a so-called residual-ray frequency where a crystal reflects or re-radiates the incident energy most strongly. Such frequencies lie in the infra-red end of the spectrum for most crystals. By proper choice of the material therefore, a resonant point may be selected to fall anywhere beyond a wave-length of approximately 5 microns up to wavelengths merging with the millimeter band.

Since these vibrations involve a resonance between the incident energy and a particular mode of the lattice vibrations only, they do not correspond to an ordinary heating of the crystal which involves all of its vibration modes. It will thus be apparent that the production of a signal through the change of the mean-free path for secondaries does not depend upon the absorption of the energy i.e., the heating of the bulk of the crystal so that it is not as critically dependent on the total amount of radiant energy present as are other thermal detectors.

It is believed that the depth of formation of the average secondary is small compared to the range of the primary electron and that an average depth of formation exists which increases only with the square-root of the energy of the primary particle. In an insulator crystal of the instant character a slow electron can only lose energy either by exciting an atom, which requires an energy greater than the lowest excitation potential or by low energy quasi-elastic collisions with the atom as a whole and in which electrons of low energy can only lose very small amounts of energy. Therefore once a secondary electron has slowed down below the energy necessary for excitation of an atom, it can only lose small fractions of its remaining energy per collision thereby enabling it to diffuse over larger distances. This will lead to a larger value of secondary emission from insulators in comparison with the characteristics for metals. In the case of metals the secondaries can only travel a distance of the order one atomic diameter before losing a large fraction of their energy.

The lattice vibrations hereinbefore set forth occur with frequencies which are widely distributed over the spectrum ranging all the way from low frequency acoustical vibrations to an upper-limiting frequency in the far infra-red.

The relative amounts of energy in each frequency interval can be estimated for single crystals on the basis of theories of specific heat. It can be shown that the upper-limiting frequency corresponds to the mode in which a simple ionic crystal for instance, is most strongly polarized and therefore re-radiates or reflects incident energy most intensely. This mode in which oppositely charged ions adjacent to each other move in opposite phases is commonly called a residual-ray vibration because it can be detected experimentally through repeated reflections after which only radiation of this particular frequency remains in the beam.

For a simple ionic crystal, the residual ion frequency is simply related to the masses of the ions, the heavier the ions the lower the resonant frequency, and for a constant type of force, as for example the case of ionic crystals having a given kind of negative or positive ion, the frequency varies inversely as the square-root of the mass of the other ion. This relationship will be apparent from the following expression wherein the frequency of an isolated atom at an equilibrium condition and possessing a certain mean energy $\overline{E}$ equal to $3kT$ for the case of temperature equilibrium and which is written:

$$V_R = [\overline{E}/2\pi^2 M s^2]^{1/2}$$

$V_R$ is the residual-ray frequency, M is the mass in the ion or atom, $s$ is the maximum displacement from the equilibrium position, $k$ is Boltzmann's constant and T is the absolute temperature.

Since individual ions do not oscillate independently the crystal must be considered as a whole to possess a definite number of vibrational modes. This is done in the Debye and Born theories of crystals. Using these theories and the quantum mechanical treatment of the linear harmonic oscillator, one can derive expression for the distribution of amplitudes among the different modes for the cases of temperature equilibrium. It can thus be shown that at temperature equilibrium most of the energy is found in low frequency vibrational modes that are not optically active. This provides the desirable consequence that any energy in the residual-ray band incident on a crystal will not be heavily masked by similar vibrations already present in the lattice.

In the case of more complicated crystals containing complex ions, and of the character of carbonates and silicates, a somewhat similar situation exists but with the additional relationship that so called internal modes of the complex ions can occur beside the "external" modes. In the motion of complex ions as a whole these so called "internal" modes are generally of a much higher frequency than the external modes since they involve the vibration of a very strongly bound system of usually quite light masses, as for example the case of the $CO_3$ or $SiO_2$ complex crystals which are well adapted for use with this invention. These modes which may therefore lead to residual-ray maxima wave lengths as short as $7\mu$ for $CO_3$ or $9\mu$ for $SiO_4$ compared to wave lengths in the order of $20\mu$ to $80\mu$ of ionic crystals. Therefore it will be primarily such complex crystals which become of particular interest for image tube purposes in the selected frequency band of the atmospheric window.

It is further to be noted that internal vibrations of the complex atoms are practically unaffected by chemical combinations with different positive metallic ions. Even when in solution, the complex ions are bound to possess very nearly the same frequency characteristics. These modes are thus only weakly coupled to other modes, with the results that associated reflection maxima are quite narrow and intense. The effect thereof is that these modes are particularly weakly damped, so that a small amount of energy will induce large amplitude vibration, just as in the case of a tuned circuit at resonance with only very minute amounts of added energy being required to build up very intense vibrations. If only small amounts of energy are needed to induce large distortions of the lattice the sensitivity of the secondary electron process to incident radiation will be stronger than in cases where no such resonance amplification occurs.

Since these vibrations of the complex ions are essentially determined by the complex ion alone it is possible to select suitable materials which combine desirable chemical, optical and secondary emission properties from a large variety of chemical compounds.

One object of this invention resides in the provision of a sensitive layer for use in far infra-red detection apparatus which provides optimum sensitivity and an improved response over systems heretofore or now in general use.

Another object of this invention resides in the employment of an image sensitive layer having a resonance response to radiation in a desired spectral region of detection whereby minute quantities of such radiation will produce very large amplitude vibrations of a character adapted for detection and response measurement.

An additional object resides in the utilization of the change in secondary emission produced in a semi-conducting crystal surface with thermal energy excitation of the crystal lattice which is of a resonant type and inherently very sensitive to very small quantities of radiation.

A further object of this invention resides in the utilization of a surface of a resonant type wherein the region of optimum sensitivity can be chosen by proper selection of the crystalline sensitive material for correspondence to the transmission conditions of the atmosphere through which the energy radiation passes to the sensitive surface. It is also an object of this invention to provide a method of infra-red image detection and to provide for image display on conventional television type apparatus which is free of undesirable time lags due to thermal equilibrium in the surfaces as is unavoidable in detection systems heretofore in use of those types depending upon heating of the film and backing electrodes.

It is a further object of this invention to provide a sensitive surface of a type adapted for construction in a device of extreme simplicity, compactness, and accuracy and which requires a minimum of elaborate auxiliary temperature control devices and circuits for use therewith.

It is an additional object of this invention to provide an infra-red detection tube utilizing a crystal surface, the sensitivity of which can be made very high by suitable choice of primary current and value of load resistor used therewith, which device is of essentially a constant current nature.

Another object resides in the utilization of a sensitive conductor crystal layer having no inherent limitation as to resolution of detail obtainable in the image as for example by heat spreading encountered in prior devices.

An additional object of the invention resides in the use of a sensitive layer which is simple to prepare and which displays an inherently high secondary emission as required for high sensitivity.

It is a further object of this invention to provide an image detection device characterized by the relationship wherein the signal current reaches the multiplier pick-up only when an optical image is present, thereby providing a relationship wherein no dark or back-ground current is presented to the amplifier.

It is a further object of this invention to provide a sensitive surface having an inherent absence of re-distribution current necessary in conventional iconoscopes thereby providing a stable back-ground level.

It is also an object of this invention to provide a thermal image detection tube sensitive to far infra-red radiation, wherein increased sensitivity is provided by electron multiplication within the tube thereby providing improved signal to noise ratios over prior type devices and wherein back-ground current is maintained at a minimum to obviate noise when no optical image is present.

It is a further object of this invention to provide a sensitive surface wherein optimum operating conditions for secondary emission effects on the high energy surface may be established independent of the optimum position for the deflection effect on the opposite side.

Other objects and many of the attendant advantages of this invention will be readily appreciated as the same becomes better understood by reference to the following detailed description when considered in connection with the accompanying drawings wherein:

FIG. 1 is a diagrammatic illustration of a far infra-red heat image detecting tube of one embodiment of the instant invention utilizing a scanning type point by point probing of the detection surface for signal intelligence;

FIG. 2 is a diagrammatic showing of a second type of detection and image pick-up tube wherein the surface subjected to far infra-red imaging radiation is utilized for image signal intelligence by a probing beam and a photomultiplier within a common envelope and wherein the scanning by a fast electron beam for emission of secondary electrons is carried out in synchronism with the scanning of the probing beam;

FIG. 4 is a graphical showing of the atmospheric transmission characteristics under typical conditions for a water content of 17 mm. per sea mile;

FIGS. 5a, 5b and 5c are representative curves of the reflection spectral characteristics of several complex crystals displaying resonance in the preferred atmospheric window bands of FIG. 4 and respectively with corresponding abscissa and ordinate thereto, and which refer respectively to silicon dioxide, calcium carbonate and calcium sulphate with 2 molecules of water;

FIG. 6 is a cross sectional view of a sensitive surface showing in a representative manner the decrease in the secondary emission therefrom in the central area thereof with subjection to infra-red radiation and with substantially the entire area under primary electron bombardment;

Fig. 7 is a graphical representation of the behavior of the sensitive surface at the lattice resonant condition thereof and showing the penetration and dispersion activity of primary electrons impinging thereon;

FIG. 8a is a curve illustrating the distribution characteristics of secondary electrons in a light metal; and FIG. 8b is a composite comparative curve similar to FIG. 8a with curve 8a superimposed thereon and showing further the distribution of secondaries in an insulator of ionic crystalline character and at different temperatures, and providing a representation of the mean diffusion distance of slow secondaries.

Figure 1:
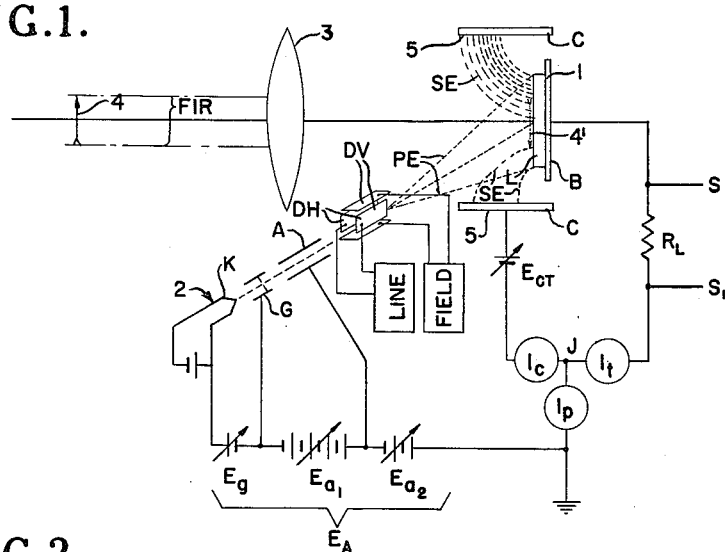

Referring now to FIG. 1 of the drawings for a more detailed description of the apparatus embodiments of this invention and a better understanding of the operative components thereof, there is shown a thin sensitive element 1 which is subjected to primary electron beam impingement from an electron gun 2 and further subjected to far infra-red radiation from a heated source object 4 as focused thereon by a lens or optical system at 3 which produces the inverted image 4' on the front surface of the sensitive element 1.

Figure 2:
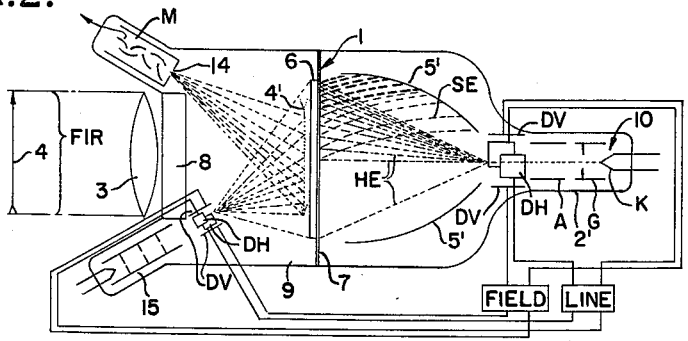

The electron gun 2 of FIG. 1, or 2' of FIG. 2 is of a conventional nature and comprises a cathode emitter K, grid G, anode elements indicated generally at A, for acceleration and focusing, horizontal deflection plates DH with suitable sweep circuitry of a conventional nature designated in block form for the line sweep, and vertical deflection plates at DV also controlled by suitable sweep circuitry as indicated by the vertical or field sweep block. The primary electrons from the cathode K are caused to impinge as a fine beam P.E. upon the crystalline layer L of the back electrode B.

This scanning beam of primary electrons P.E. functions to liberate secondary electrons SE as shown on FIG. 6, and which for purposes of clarity of illustration are shown only above the center of the surface 1, with a greater concentration of secondaries flowing from the area not subjected to imaging radiation as indicated by the inverted image arrow. The secondary electrons SE are drawn to the positively charged collector plates C and C' which comprise the electrode 5 for flow through the battery $E_{CT}$ to the junction J. A signal current flow $I_t$ occurs with greater secondary emission from L than primary electron impingement thereon, and $I_c$ becomes greater than $I_p$. The current difference between $I_c$ and $I_p$ flow through load resistor $R_L$ and back plate B to L as back plate or signal current $I_t$, while the current $I_p$ flows with the beam to the front of L. The resistor $R_L$ functions as a load to furnish a signal across S and Si with variations in current $I_t$. The ratio of $I_c$ to $I_p$ may be expressed conveniently by $\delta$ to indicate the coefficient of secondary emission.

The ratio $\delta$ is characteristic of the material employed for L at fixed voltage conditions of accelerating voltage $E_A$ and collector plate potential $E_{CT}$.

Variations in this ratio from point to point of the layer L occur with irradiation of portions thereof with radiant energy entering through the optical system at 3. The thermal image is thus focused upon the layer L, to produce variations in the liberation of secondary electrons, and current changes in $I_t$ with point to point scanning by electron beam P.E. The system thereby functions to provide a signal across the load resistor $R_L$ which can be amplified in a well known manner and utilized in a conventional circuitry to control television-type receiving tubes which are operated in synchronism with the scanning arrangements of the instant far infrared thermal detection and image tube.

The apparatus embodiment of the instant invention as herein set forth with respect to the showing of FIG. 2 of the drawings incorporates image detection principles analogous to that of the conventional image orthicon system but provides improved performance thereover by the utilization of the aforementioned ionic crystal as a detection element for far infra-red imaging and additionally provides certain improvements over the hereinbefore set forth detection device which obtains the signal by scanning a detection crystal which was subjected to infra-red radiation and amplifying the momentary signal current generated in the backing plate circuit with secondary electron flow to the collectors.

The arrangement of the former circuit is such that the sweep of the scanning beam P.E. and the infra-red illuminated imaging spot 4' are on the same side of the crystal.

The device of FIG. 2 in addition to providing certain improved arrangements from that of FIG. 1, overcomes the dark current limitations inherent in a system of the iconoscope type which somewhat limits the sensitivity and signal-to-noise ratio thereof. While the embodiment of FIG. 1 requires external amplification of the signal, the image-orthicon type device herein to be described provides for internal amplification of the signal by means of a photo-multiplier M which further eliminates certain of these undesirable features and provides an even larger inherent signal-to-noise ratio than is obtainable in the conventional image-orthicon which likewise was developed to overcome the limitation encountered in the iconoscope type tube system.

The instant embodiment differs from that of the previously described system in that the crystalline film is provided on a thin transparent supporting film at 7 such for example as that known in the trade as Collodion, or a similar material through which high energy electrons can penetrate. In the event the crystalline film is of self-supporting nature the supporting film may be eliminated.

The image is focused on the side of the support film and crystalline layer on which the crystalline material is deposited. The far infra-red radiation as indicated by the character FIR on FIG. 6, and from source 4 is passed through a suitable optical lens 3 and filter system at 8 in the envelope 9 on to the crystalline layers 6. On the opposite side of the film, a high energy beam of primary electrons indicated HE from the electron gun 10 uniformly scans or floods as the case may be, the whole surface, in such a manner that the primary electrons PE of this beam pass well through the support 7 upon impingement thereagainst and into the crystalline material, where they function to liberate secondary electrons.

Figure 3:
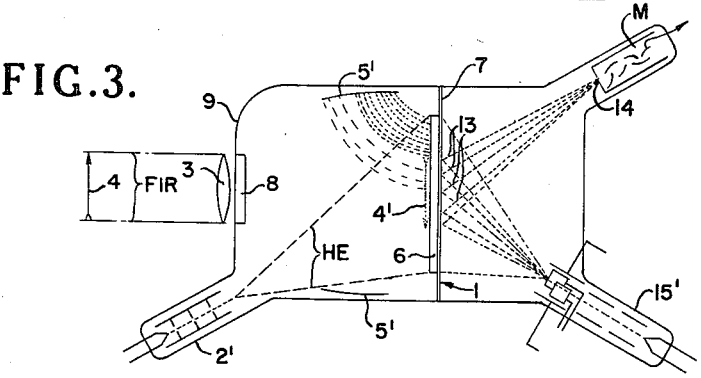
FIG. 3 is an illustration in diagrammatic form of an additional detection and image tube embodiment of the instant invention wherein the surface remote from that subjected to far infra-red radiation is utilized for image signal intelligence, and which is illustrated as incorporating a flooding beam of fast electrons for the emission and collection of secondaries.

The electron bombarding beam HE from the gun 10 provides for liberation of secondaries SE from the back surface of 7 for migration or flow to the collector plates 5', and in greater numbers as shown by the heavy dashed lines from the area which is unaffected by FIR radiation. It is to be understood that secondaries are liberated from the area subjected to imaging radiation but to a lesser extent sufficient to derive a signal output from the reduction occurring at the resonant frequency of the crystal lattice. The gun 10 for HE and the probing gun 15 incorporate locked-in synchronization arrangements for the respective sweep circuits thereof as shown in block form, in order that probing occur in coincidence with the bombardment sweep of HE. With the embodiment of FIG. 3 no interlock between 2' and 15' need occur since the gun 2' provides a flooding type beam pattern rather than a pin point type as shown in FIGS. 1 and 2. In the showing of FIG. 3 the difference between an imaged area along 4' and non-imaged area of 6 is indicated by greater number of dashes in the pattern for the latter. Although not so shown for purposes of clarity in the drawings, the pattern would correspond for the area below the center of the FIR beam. This likewise is the case for FIG. 2. The energy level of the primary electrons is suitably controlled such that the primaries do not penetrate the crystalline film completely thereby providing a relationship whereby secondary electrons SE are essentially only emittedly toward the entrance side of the primaries PE as indicated in the enlarged view of the film cross-section of FIG. 6.

The far infra-red radiation impinging the crystalline layer 6 on the surface opposite that bombarded by the high energy primary electrons functions to excite lattice vibrations into resonance and at the frequency of the irradiation, thereby reducing the secondary emission from that image area and producing a resultant negative potential with respect to the neighboring areas of the surface. The crystal surface subjected to the high energy primary electron beam charges up as a whole to a potential slightly positive with respect to the collector 5' of secondary emission of FIG. 2.

The response of the surface of the crystal which is subjected to imaging radiation tends to establish a negative area with respect to the adjacent surrounding areas and corresponding to the instantaneous spot at 13 corresponding to a portion of 4' on which the image falls which is utilized for signal pickup.

The signal pickup from the imaged surface occurs with low energy beam probing from gun 15 or 15', which is controlled in intensity to neutralize the charge deficiency on the surface areas not receiving imaging thermal energy from source 4.

The point by point probing beam of gun 15 is only reflected to the photo-multiplier M of the tube from areas possessing signal energy intelligence, and only negligible current can reach the multiplier pickup tube until the probing beam reaches the image spot.

At these spots 13 as indicated along the surface opposed to the image 4' of FIG. 3 for example, there is an excessive number of electrons present, rendering this portion slightly more negative and part of the scanning beam is repelled. This beam when properly focused by focus circuitry not shown, but of a conventional nature with image-orthicon tubes, will direct the electrons toward 14 to reach the electron multiplier for generation of a signal, and subsequent amplification of the signal therein. This signal can thereafter be used to provide a train of television signals to reproduce the image by the usual television methods incorporating tubes having scanning controls operated in synchronism with the scanning system of this tube structure, and of either electrostatic or electro-magnetic character.

In this type system it is to be noted that the signal current reaches the multiplier only when far infra-red optical image 4' is present on the crystalline surface. No dark or back ground current is passed to the amplifier with impingement by the probing beam on various parts of the sensitive layers not possessing a signal image.

The crystalline surface, FIG. 6, is selected from a group of crystals having a refractive index providing frequency resonance of the crystal lattice in the range of 8 to 13 microns as will be apparent from FIGS. 5a, 5b and 5c which corresponds to the atmospheric window of FIG. 4 through which the infra-red image beam is to be passed. Since most ionic crystals possess a resonant frequency in the far infra-red range it is therefore necessary only to select a crystal, as determined by refractive tests thereon, having a high resonant frequency corresponding to the particular window effect utilized for the infra-red atmospheric penetration.

A system such as that utilized in the structure of FIG. 2 provides a complete absence of re-distribution current, as is necessary in iconoscopes, thereby providing a stable back ground level, with little or no dark current to produce noise. The signal-to-noise level is thereby improved over image-orthicon tubes which depend on increased secondary emission for image production.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent in the United States is:

1. The method of obtaining far infra-red signal image intelligence in a detection tube system of a character incorporating an image tube circuit, an electron gun means therein for providing a flow of primary electrons, a detection element and image intelligence pick-up means for ultimate image display, the steps of subjecting a homogeneous crystalline sensitive surface therein to imaging radiation of a spectral band corresponding to the resonant frequency of the crystal lattice, applying an electron beam of high intensity primaries to said crystal from said electron gun, collecting the secondary electrons emitted by said surface in the plate circuit of said electron gun means and detecting with said image pick-up means, the point by point signal output from said crystal and correlative to changes in secondary emission indicative of the point by point image thereon.

2. The method of deriving a measurable signal output indicative of operating an image tube type detection apparatus for a far infra-red image, from a homogeneous crystalline detection surface, correlative to decreases of secondary emission therein in the presence of an image, which comprises the steps of subjecting the surface of a detecting element of the tube to far infra-red imaging radiation of a frequency corresponding to the resonant frequency of the crystal lattice, simultaneously bombarding the crystal surface with fast primary electrons, probing said surface in a point by point manner for changes in secondary emission therefrom correlative to the image on said surface, and providing an electrical signal output suitable for subsequent picture tube imaging corresponding to secondary emission changes detected with said probing.

3. The method of operating an imaging tube type detection apparatus for providing image signals of a character adapted for utilization in television picture tube apparatus as derived from far infra-red imaging bodies which comprises the steps of subjecting one surface of a homogeneous crystalline sensitive element therein to radiation from said image body and of a spectral band corresponding to the resonant frequency of the crystal lattice, flooding the opposite surface of said crystal with a beam of high-intensity primary electrons, collecting the secondary electrons emitted by said surface under action of said flooding beam, probing said first surface in point by point relation to derive a signal output correlative to decreases in secondary emission under influences of said imaging radiation, applying reflections of said probing beam at said image areas to photo-multiplier means for providing a signal output suitable for application to a television tube system and providing a synchronization output correlative to the sweep of said point by point probing for utilization with the sweep circuitry of display television system.

4. The method of operating a system for obtaining far infra-red image signal intelligence for ultimate display in television tube apparatus which comprises operating an image detection tube apparatus in synchronism with a synchronising sweep circuitry of an imaging tube which comprises the steps of subjecting a homogeneous crystalline surface of said tube to far infra-red radiation of a spectral frequency corresponding to the resonant frequency of the crystal lattice, applying a high intensity primary electron beam to one surface of said crystal in point by point relation as controlled by said sweep circuitry, collecting the secondary electrons emitted by said surface under influences of said sweep beam, directing a low velocity electron beam continuously on said crystal surface subjected to the infra-red image, detecting a signal output by applying reflections of said low velocity beam on to a photo-multiplier for control of the picture tube in correlation wtih the decreases of secondary emission occurring with sweep of said high intensity beam onto imaged areas of said crystal.

5. A far infra-red imaging tube comprising a detection surface element of homogeneous crystalline material having the lattice resonant frequency thereof in the spectral band of 8 to 13 microns to be detected, means providing fast electron bombardment of said element by primary electrons, means for presenting an optical infra-red image on said surface, and means responsive to changes in the secondary electron emission from said surface for providing an image signal output.

6. A device of the character described for attaining far infra-red image detection and ultimate image display on television type viewing tubes, in combination with an optical system for focusing a radiant image on said detector, said detecting means comprising a homogeneous crystalline detection layer, thin supporting means for said layer, an electron gun system for subjecting one face surface of said crystalline layer to primary electron bombardment for the emission of secondary electrons therefrom, and means providing a signal output from said surface correlative with changes in the secondary emission from the imaged portion of said surface layer.

7. In combination with apparatus of a character providing an output suitable for use with a television tube system for displaying of imaging intelligence, a far infra-red imaging tube of the character described, comprising a detection surface layer of homogeneous crystalline material having a resonant frequency of the lattice thereof in the spectral band to be detected, electron gun means for providing fast electron bombardment of said surface layer by primary electrons, and in point by point relation on said layer, primary electron gun probing means for detecting image intelligence from said surface, photo-multiplier means for pickup of the probing primaries reflected by said surface from the area thereof possessing the far infra-red image, means for collecting the secondary electrons migrating from said surface under action of the bombarding electron beam, and means including sweep circuitry for deriving a reproducible image output from said photo-multiplier.

8. In a far infra-red detection and imaging system the combination with a display tube system, of a far infra-red imaging tube comprising a detection surface of a crystalline material possessing a resonant frequency of the lattice thereof in the spectral band of the far infra-red radiation to be detected, means providing primary electron flooding bombardment of a first face surface of said crystalline material, electron gun probing means including sweep circuit means for direction and reflection of electrons from a face surface remote from said first surface for point by point pickup of signal intelligence correlative with the secondary emission from said crystalline layer material in the presence of imaging radiation, and photomultiplier means for pickup of reflected primary electrons from said probing gun and for producing an imaging signal therefrom, said sweep means being of a character providing an output for electroresponsive indicating apparatus operated in synchronism with said probing gun for synchronization control thereof.

References Cited in the file of this patent
UNITED STATES PATENTS

| | | |
|---|---|---|
| 2,156,392 | Iams | May 2, 1939 |
| 2,242,952 | Hergenrother | May 20, 1941 |
| 2,374,914 | Behne et al. | May 1, 1945 |